G. A. PARKER.
WINDOW CLEANER.
APPLICATION FILED FEB. 27, 1917.
1,270,197.
Patented June 18, 1918.
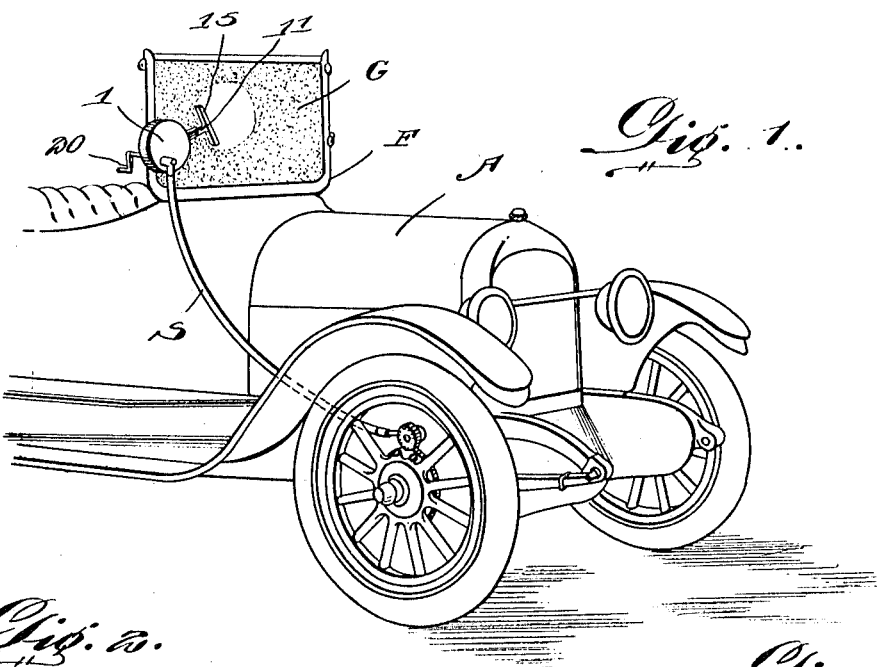
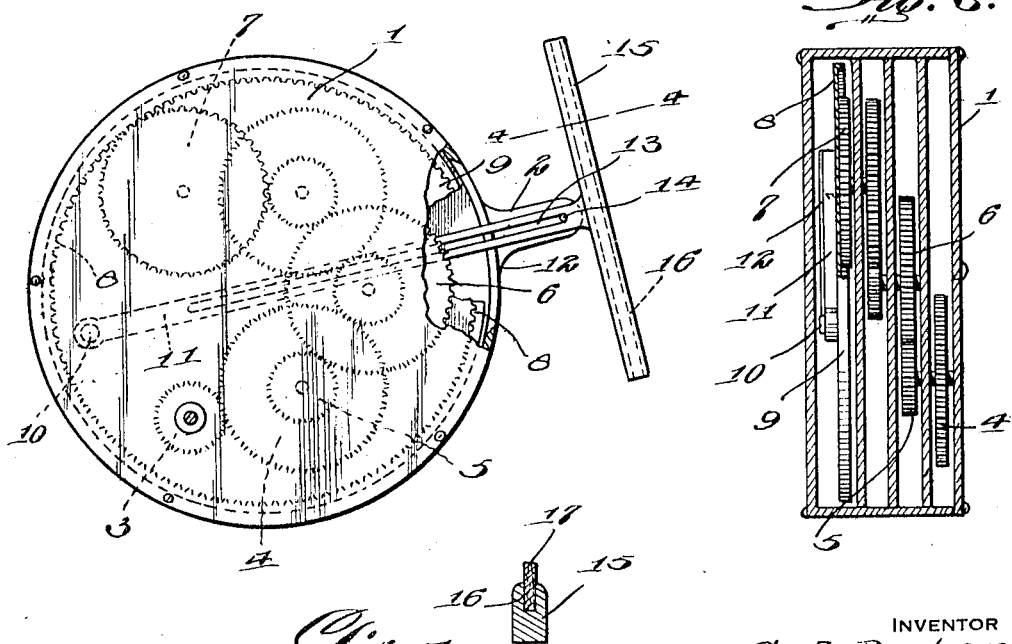
WITNESSES
Frederick L. Fox,
N. L. Collamer.
INVENTOR
G. A. Parker.
BY Victor J. Evans.
ATTORNEY

UNITED STATES PATENT OFFICE.

GEORGE A. PARKER, OF LINOLEUMVILLE, NEW YORK.

WINDOW-CLEANER.

1,270,197.  Specification of Letters Patent.  Patented June 18, 1918.

Application filed February 27, 1917. Serial No. 151,273.

*To all whom it may concern:*

Be it known that I, GEORGE A. PARKER, a citizen of the United States, residing at Linoleumville, in the county of Richmond and State of New York, have invented new and useful Improvements in Window-Cleaners, of which the following is a specification.

This invention relates to brushing and scrubbing, and more especially to window cleaners; and the object of the same is to produce an improved device of this character especially adapted for removing water, snow, and moisture from the outside of the wind shield of an automobile, or it might be the front window of a motor car or of a cab in a locomotive.

The object of the invention is to produce a light structure including a casing to be supported on the window sash or the frame of the wind shield and containing train of reducing gears, the first being connected by a flexible shaft with some rapidly moving part, such as the wheel of an automobile, and the last or slowest moving gear being connected with a wiping arm whose active edge cleans an oval space on the outer side of the glass.

This object is accomplished by constructing the device in the manner hereinafter more fully described and claimed, as shown in the drawings herein:—

Figure 1 is a perspective view of the forward portion of an automobile with this attachment applied.

Fig. 2 is a front elevation of the casing and the arm applied thereto, the train of gears being indicated in dotted lines.

Fig. 3 is a sectional view through the casing.

Fig. 4 is a cross sectional detail on the line 4—4 of Fig. 2.

The automobile A in Fig. 1 carries a wind shield whose glass G is mounted within a frame F as usual, but I desire it distinctly understood that this glass might be the front pane of a motor car or the glass in the front window of a locomotive cab or the like. The letter S designates a flexible shaft, such as usually connects one of the front wheels on an automobile with the speedometer on the dash, the connection being by way of a small gear attached to the inner end of the wheel-hub. I might conveniently use this gear, and drive the lower end of the flexible shaft therefrom without the necessity for making any other attachment to a rapidly moving part. If the vehicle be a motor car or a locomotive, the flexible shaft will be connected to and driven by some rapidly rotating part not necessary to specify.

Coming now to the details of the present invention, the numeral 1 designates a casing which is substantially cylindrical throughout except for an extending ear at what will be its inner side or that edge which projects over the glass G of the wind shield, and this casing is attached to the frame F in any suitable manner, not necessary to illustrate in detail. Within the casing is disposed a train of gears, designated in dotted lines in Fig. 2 and shown in section in Fig. 3, and the first gear 3 is shown as connected directly with the flexible shaft S and meshing with a second and larger gear 4, whose hub carries a smaller gear 5 which in turn meshes with a larger gear 6, and so on throughout the series to the last gear 7 which meshes with internal teeth 8 in the large or what I will call the driving gear 9—the latter therefore revolving quite slowly even though the flexible shaft S may be rotated at a high rate of speed. This driving gear carries a wrist pin 10, and pivoted thereto is a long arm 11 which extends across and projects through the inner side of the casing 1 where it is provided with an opening 12 for that purpose, beyond which the arm continues across the ear 2 as shown. The arm is slotted as at 13, and the slot is slidably mounted on a pin 14 carried by the ear 2. The outer end of the arm carries a cross bar 15 which is channeled as shown at 16 in Fig. 4, and in the channel is inserted a wiper 17 of felt or the like, whose projecting edge contacts with the front face of the glass G.

When now motion is applied to the shaft S and communicated through the train of gears to the driving gear 9, the wrist pin 10 of the latter causes the movement of the arm 11 so that its pivoted end swings through a large circle, its center rocks over the pin 14 and its end carrying the cross bar 15 and wiper 17 causes the latter to travel over a space on the front face of the glass G and clean the same from accumulation.

The space thus cleaned will be oval or ovoid as indicated in Fig. 1, and it is intended that this space shall be directly in front of the driver's face so that he can see clearly through the glass what is ahead. Of course he is at liberty to reach forward and wipe the inner face of the glass with his hand or glove, and therefore his vision is unobstructed no matter what the weather. I have not thought it necessary to show connections between the shaft S and the first gear 3, but these connections could be such that motion might be imparted to the device at any time, and at any time when it is not desired to have it work the power might be cut off; or the shaft itself might contain a clutch within its length, actuated by a hand lever within reach of the operator. These devices for starting and stopping any mechanism are well known in various arts, and even if one should be employed in this connection its details of construction would form no part of the present invention. I have thought it necessary to show only a hand lever or crank handle 20 in Fig. 1 as projecting rearward from the casing 1 to a point within reach of the operator, and by turning the same he can disconnect the shaft from the first gear 3 by any suitable means and throw the device out of action. At that time the arm 11 and cross bar 15 would of course stand across the front of the glass G, but as I preferably make these members extremely light, they will hardly obstruct the vision at all. In fact, there is no necessity of giving any great strength to the device, as it only carries a wiper 17 and presses the same with sufficient force against the glass to remove water, snow, dust, or moisture. Materials and proportions or parts are not essential to the successful operation of the invention.

I wish particularly to emphasize the purpose of the arrangement illustrated, bringing to mind, compactness, simplicity, efficiency and a structure which is calculated to afford a non-obstructed or clear line of vision through the glass panel of the wind shield as will be observed on reference to Fig. 1. The casing 1, is designed whereby it can be arranged at one side of the wind shield with the wiper 15, traversing such a small portion of the glass as to render it almost unnoticeable.

While the device is principally designed for use in connection with vehicles of any general type, I of course, do not wish to limit myself to such use. For instance, it may be found of value when used in the cabs of locomotives or in the steering rooms of vessels. There may also be an occasion when the device may be extremely useful upon windows or glass panels of other description.

What is claimed as new is:—

1. In a window cleaner of the class described, the combination with a substantially cylindrical casing having an ear projecting from one side and an opening in its wall adjacent said ear, a pin carried by the ear, a wheel rotatably mounted within the casing and having a wrist pin, and means for driving this wheel; of an arm pivoted at one end on the wrist pin and extending through said opening in the casing, its body being slotted and the slot standing astride said pin, and a cross bar at the outer end of said arm carrying a wiper, for the purpose set forth.

2. In a cleaning device for the glass of wind shields on automobiles, the combination with a casing having an ear on one side provided with a pin, the casing adapted for attachment to the frame of the wind shield with the ear overlying the outer face of its glass, a driving wheel rotatably mounted within said casing and having a wrist pin, a power gear within said casing, and a train of gears connecting the power gear with the driving wheel so as to reduce the speed of rotation of the latter; of means adapted to be connected with a rapidly rotating part of the machine for driving said power gear, an arm pivoted at one end on said wrist pin and having a slotted body slidably mounted over the pin in the ear, and a glass-wiper carried by the other end of the arm.

In testimony whereof I affix my signature.

GEORGE A. PARKER.